INVENTORS
HISAYOSHI UEOKA
KAZUO HORII
KAZUMASA UMEYA
SYUNSUKE MARUYAMA
BY Wenderoth, Lind & Ponack
ATTORNEYS INVENTORS
HISAYOSHI UEOKA
KAZUO HORII
KAZUMASA UMEYA
SYUNSUKE MARUYAMA
BY Wenderoth, Lind & Ponack
ATTORNEYS INVENTORS
HISAYOSHI UEOKA
KAZUO HORII
KAZUMASA UMEYA
SYUNSUKE MARUYAMA
BY Wenderoth, Lind & Ponack
ATTORNEYS

United States Patent Office 3,704,266
Patented Nov. 28, 1972

3,704,266

BARIUM TITANOZIRCONATE SEMICONDUCTING CERAMIC COMPOSITIONS

Hisayoshi Ueoka, Ichikawa-shi, Kazuo Horii, Hunabashi-shi, and Kazumasa Umeya and Syunsuke Maruyama, Ichikawa-shi, Japan, assignors to TDK Electronics Co., Ltd., Tokyo, Japan Filed Nov. 18, 1969, Ser. No. 877,768
Claims priority, application Japan, Nov. 18, 1968, 43/83,968
Int. Cl. C04b *33/00;* H01b *1/06*
U.S. Cl. 252—520 6 Claims

ABSTRACT OF THE DISCLOSURE

Ceramic semiconducting compositions are provided herein in which the compositions consist primarily of barium titanozirconate solid solutions, represented by the formula $Ba(Ti, Zr)O_3$ obtained by substituting part of $BaTiO_3$ with $BaZrO_3$ and in which small amounts of $Bi_2O_3$ and $TiO_2$ are added thereto, such that the range of proportions of the compositions fall within the region bounded by the line A–B–C–D–E–F–G and in which about 0.01 to 2 mol percent of Mn ions are added thereto. The disclosure also provides for a method of producing compositions having the aforementioned proportions by mixing the various ingredients together, pressing them into the desired shape and then sintering the compositions in air followed by reducing the compositions in a reducing atmosphere. Ceramics produced from such compositions contain a large capacitance, among other desirable properties, which make them suitable for use as by-pass capacitors or for use in various discriminating circuits.

DETAILED DESCRIPTION OF THE INVENTION

Figure 1:
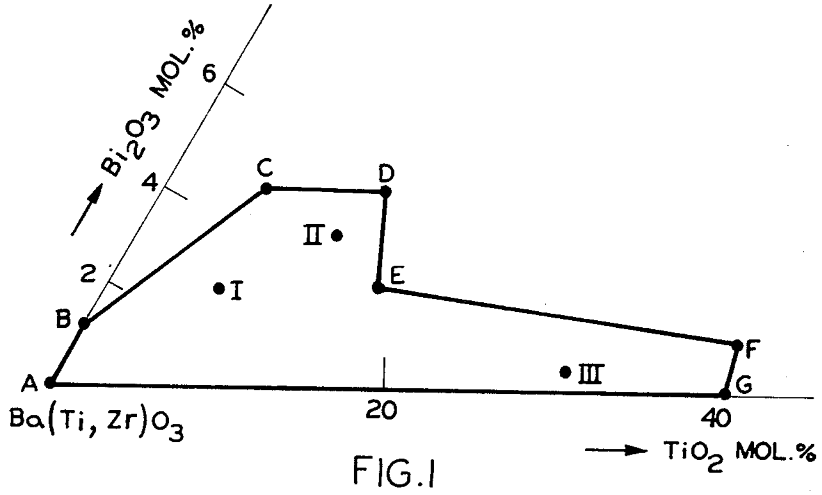
FIG. 1 is a part of the pseudo-triangular diagram, which shows the range of compositions of this invention.

This invention relates to semiconducting ceramic compositions useful for the production of barium titanate semiconducting capacitors, particularly the capacitors which show very preferable properties when employed as a by-pass capacitor or in various discriminating circuits. In accordance with this invention, the said ceramic compositions consist predominantly of the nonstoichiometric solid solutions which are derived from the mixture composed mainly of barium titanozirconate solid solutions, obtained by substituting barium titanate ($BaTiO_3$) with barium zirconate ($BaZrO_3$) and in which minor proportions of suitable amounts of bismuth oxide ($Bi_2O_3$), titanium oxide ($TiO_2$) and manganese (Mn) ions are added thereto. This mixture is then fired in a reducing atmosphere and some amount of oxygen eliminated therefrom to produce the semiconducting ceramic compositions.

Although semiconducting ceramic capacitors are a relatively new field of invention, it is now recognized that they are superior to conventional insulating ceramic capacitors in that they exhibit a large capacitance, are small in size and relatively compact, and exhibit other excellent characteristics. Semiconducting ceramic bodies for use as capacitors, the main constituent of which is barium titanate, are classified into two types, viz. the valence control type and the oxidation type, according to their composition and their method of production. The semiconducting ceramic bodies of the valence control type are composed predominantly of barium titanate to which minor amounts of other elements, which have an ionic radius similar to those of the constituents of barium titanate but with a different valency, are added thereto. Since the characteristics of these valence control type semiconductors are strongly affected by the purity of raw materials, the maintenance of the said purity during the manufacturing process, and the necessity of accurately weighing the raw materials in order to combine them in suitable proportions, make it difficult, if not impossible to produce such ceramics on an industrial scale. In fact, it is difficult to prepare such ceramics in the laboratory, let alone on an industrial scale. In addition, the valence control type semiconductors have other defects in that their specific resistivity cannot be lowered below 10 ohm-cm. with ease, and their electrical properties are intrinsically fixed so that the temperature dependence of their capacitance cannot be changed arbitrarily.

The capacitors made from ceramics of the oxidation-reduction type are free of the defects peculiar to the valence control type ceramics but have other difficulties. For example, capacitors of this type, that is those having barrier-capacitive layers generally have such defects that the insulation resistivity and capacitance of the capacitors show a sharp fall when the applied voltage is increased and therefore their working voltage in usual practical applications is near about 10 volts whereas the upper limit is fixed at about 12 volts. Another shortcoming of these capacitors is that undesirable changes of the electrical properties occur when lead wires are directly soldered to silver electrodes because it is difficult to stabilize the barrier layers. To prevent this, lead wires are usually attached to the silver electrodes with conductive adhesives. But in practical uses, when said capacitors are connected in a circuit, their lead wires are heated to an elevated temperature during the soldering processes, which sometimes leads to damage in the conductive adhesives. Particularly in miniaturized electric circuits, in which lead wires are short, very careful treatment is needed. Such are the reasons why the semiconducting ceramic capacitors of the oxidation reduction type have not been put into practical uses, although their utility is recognized along theoretical lines, It would be a great advantage if ceramic materials free of the foregoing defects could be produced.

It is an object of the present invention to provide semiconducting ceramic compositions free from the aforementioned defects and which ceramic compositions have a much larger capacitance than that of conventional insulating capacitors of the same dimension.

A further object is to produce semiconducting ceramic compositions such that it is possible to arbitrarily vary the temperature dependence of the capacitance in a wide temperature range.

A further object is to produce ceramics having barrier layers on the surface thereof, which layers are chemical stabilized so that undesirable changes in electrical properties do not occur.

Another object is to produce capacitors efficiently in such a manner that the electrodes attached to the ceramic surfaces are not easily damaged even in a direct soldering operation. Further, the purity of the raw materials do not have to be maintained and guarded in accordance with conventional procedures.

The ceramic compositions of this invention will now be described in connection with the drawings.

In FIG. 1, the fundamental constituent barium titano-zirconate which is the solid solution of $BaTiO_3$ and $ZrTiO_3$ (in the following this will be described as the composition $Ba(Ti, Zr)O_3$), is located at the point A and the point B corresponds to the composition in which $Ba(Ti, Zr)O_3:Bi_2O_3$ is 99:1 in molar ratio; the point C corresponds to the composition in which $$Ba(Ti, Zr)O_3:Bi_2O_3:TiO_2$$

is 90:4:6 in molar ratio; the point D corresponds to the composition in which $Ba(Ti, Zr)O_3:Bi_2O_3:TiO_2$ is 82:4:14 in molar ratio; the point E corresponds to the composition in which $Ba(Ti, Zr)O_3:Bi_2O_3:TiO_2$ is 82:2:16 in molar ratio; the point F corresponds to the composition in which $Ba(Ti, Zr)O_3:Bi_2O_3:TiO_2$ is 60:1:39 in molar ratio, and the point G corresponds to the composition in which $Ba(Ti, Zr)O_3:TiO_2$ is 60:40 in molar ratio. The region of the composition of this invention is the area surrounded by A–B–C–D–E–F–G. Mn ions of from 0.01 to 2 mol percent with respect to the $Ba(Ti, Zr)O_3$ component may be added to the compositions in said region. The raw materials may be oxides or compounds which give oxides by heating like carbonates, nitrates and so forth. They are weighed and mixed and then sintered in oxidizing atmosphere. The ceramic bodies thus obtained are reduced and made semiconductive by firing in reducing atmosphere. Then the semiconducting ceramic bodies thus obtained are equipped with silver electrodes and fired in oxidizing atmosphere. This final heat treatment serves for the plating of silver electrodes, the surface diffusion of the electrode materials and partial reoxidation at the same time. The whole processes described above are the manufacturing methods of the semiconducting capacitors of this invention and are indispensable to provide ceramic bodies with the features and properties described.

FIG. 1 is a part of pseudo-triangular diagram which specifies the ceramic compositions of this invention. The end members of the diagram are $Ba(Ti, Zr)O_3$, $Bi_2O_3$ and $TiO_2$. This figures describes the compositions solely with respect to said oxide components and the $BaZrO_3$, Mn and oxygen components are omitted. At the same time, the areas of low $Ba(Ti, Zr)O_3$ content and high $Bi_2O_3$ are also omitted. The amounts of the components are given in mol percent. The area surrounded by A–B–C–D–E–F–G is the oxide composition range of this invention and the points I, II and III in said area correspond with the Examples I, II and III respectively.

This invention will be further illustrated by the following examples.

Example I

Oxides were employed as the starting materials. They were combined and mixed so as to give the composition: $BaTiO_3$, 85.30 mol percent, $BaZrO_3$, 5.44 mol percent, $Bi_2O_3$, 1.85 mol percent, $TiO_2$, 7.41 mol percent. Mn ions were added to said mixture in the form of an aqueous solution of manganese sulfate in such amounts so as to provide a Mn ion content of 0.2 mol percent with respect to the $Ba(Ti, Zr)O_3$. Distilled water was then added to this mixture and sufficiently mixed in a ball mill with a polyethylene lining. The obtained mixture was pressed and shaped into disks of a diameter of 13.8 mm. and of a thickness of 0.5 mm. under a pressure of 2000 kg./cm.². The shaped bodies were sintered at 1250° C. in air for 2 hours, and afterward fired again at 1000° C. in a hydrogen gas flow for 2 hours. In the latter treatment, the ceramic bodies lose some amount of oxygen and become semiconductive. Then, the opposite faces of the obtained semiconductive ceramic bodies were painted with silver electrode paste. These ceramic bodies were heated in air up to about 800° C. and thus the painted silver electrode material was plated on the faces of the ceramic bodies. Finally, lead wires were directly soldered on the surface of silver electrodes by immersing in fused solder. The characteristic values of the semiconducting ceramic capacitors thus obtained are as follows:

Capacitance: 0.226 $\mu$f./cm.²
Tan $\delta$:4.3%

(these quantities were measured at 25° C. at 1 kHz. under the applied voltage of 0.5 volt).

Insulating resistance: 230 MΩ/cm.²

(measured at 25° C. under the applied voltage of 20 volts).

Example II

Oxides were employed as the starting materials. They were combined and mixed so as to give the composition: $BaTiO_3$, 79.9 mol percent, $BaZrO_3$, 5.10 mol percent, $Bi_2O_3$, 3.0 mol percent, and $TiO_2$, 12.0 mol percent. An aqueous solution of manganese was further added to this mixture in such amount that the Mn ion content might be 1.0 mol percent with respect to $Ba(Ti, Zr)O_3$. The process of preparation and other conditions were the same as in Example I. The characteristic values of the semiconducting capacitors thus obtained are as follows:

| | | |
|---|---|---|
| Capacitance | $\mu$f./cm.² | 0.19 |
| Tan $\delta$ | percent | 6.2 |
| Insulating resistance | MΩ/cm.² | 167 |

Example III

Oxides were employed as the starting materials. They were combined and mixed so as to give the composition: $BaTiO_3$, 61.35 mol percent, $BaZrO_3$, 8.37 mol percent, $Bi_2O_3$, 0.4 mol percent and $TiO_2$, 29.9 mol percent. Mn ions were then added to the mixture in the form of an aqueous solution of manganese sulfate in such amount as to produce a Mn ion content of 1.0 mol percent with respect to $Ba(Ti, Zr)O_3$. The process of preparation and other conditions were the same as in the Example I. The characteristic values of the semiconducting ceramic capacitors thus obtained are as follows:

| | | |
|---|---|---|
| Capacitance | $\mu$f./cm.² | 0.16 |
| Tan $\delta$ | percent | 7.5 |
| Insulating resistance | MΩ/cm.² | 22.8 |

Figure 2:
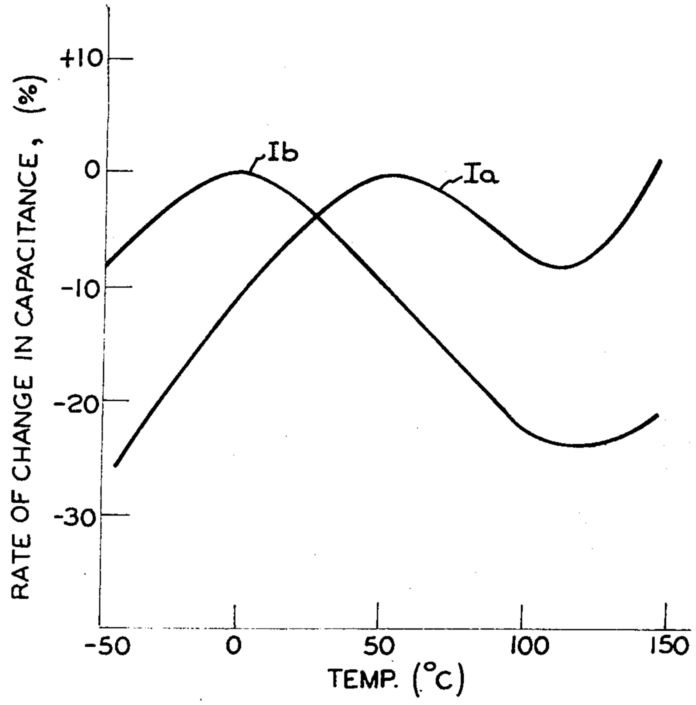
FIG. 2 graphically shows the temperature dependence of the capacitance of the capacitors of the composition of this invention.
Figure 3:
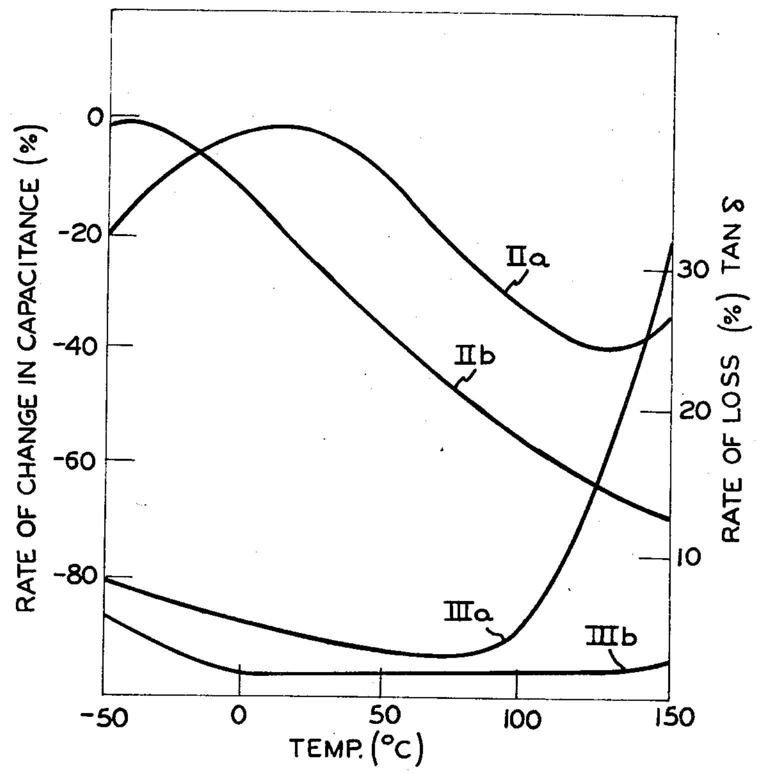
FIG. 3 illustrates the temperature dependence of the capacitance change and tan $\delta$ of those capacitors which are semiconducting bodies and insulating ceramic bodies with the same oxide compositions.

FIG. 2 graphically illustrates a typical example, which shows that the temperature dependence of the capacitance can be arbitrarily varied by controlling the composition, and also illustrates graphically the temperature dependence of the capacitance between −50 and +150° C., measured by a percentage based on the maximum value of the capacitance. Curve I*a* shows the oxide composition illustrated by specimen 3 of Table 1, and Curve I*b* shows the results of measurement in the composition in which, although the content ratio of $Bi_2O_3$ and $TiO_2$ is the same as that of the specimen 3, the content of $BaTiO_3$ is 82.92 mol percent, and that of $BaZrO_3$ is 11.31 mol percent. That is, the substituted quantity of $BaZrO_3$ into $BaTiO_3$ is twice as much as that of the specimen 3. The preparing processes and other measurement conditions are the same as in the Example I. Thus, the temperature of the maximum capacitance can be moved toward the lower temperature region through the control of the amount of substituted $BaZrO_3$, and therefore it is possible to produce semiconducting ceramic capacitors which have a large capacitance, and varying types of temperature dependence. In this case, it was found that the capacitors exhibit excellent insulating resistance and capacitance under high applied voltage, which properties were not influenced by the treatment. When the quantity of $Ba(Ti, Zr)O_3$ is constant, the temperature dependence of the capacitance can be controlled, as described above, through the variation of the quantity of added $Bi_2O_3$. Further, we can obtain semiconducting ceramic capacitors with arbitrary temperature dependence while retaining high insulating resistance and capacitance, and this is a valuable feature in practical applications. It would appear at first blush, that this property is the same as that encountered in insulating ceramic bodies mainly composed of a barium titanate solid solution, but this is not the case. FIG. 3 sets forth a graphical example. This figure shows the temperature dependence of capacitance, which is measured by percentage based on the maximum value of the capacitance, and tan $\delta$ between $-50°$ C. and $+150°$ C. It also gives the curves for the insulating ceramic capacitors of the same oxide composition as semiconducting capacitors for the convenience of comparison. That is, curves II*a* illustrate the temperature dependence of capacitance and tan $\delta$ of a semiconducting ceramic capacitor, respectively, in which the said capacitor has an oxide composition of $BaTiO_3$ 79.85 mol percent, $BaZrO_3$ 10.89 mol percent, $Bi_2O_3$ 1.85 mol percent, $TiO_2$ 7.41 mol percent, and manganese sulfate further added to this mixture in such amounts as to give an Mn ion content of 1.0 mol percent with respect to the Ba(Ti, Zr)$O_3$. The method of preparation of specimens and conditions of measurement are the same as in Example I.

Curves II*b* and III*b* in FIG. 3 show the temperature dependence of capacitance and tan $\delta$, respectively, of an insulating ceramic capacitors which has the same oxide composition as the one described above. It is obvious from these curves that the variations of capacitance and tan $\delta$ of semiconducting ceramic bodies show a very different tendency compared with those of insulating ceramic bodies. This is, another characteristic difference between semiconducting ceramic capacitors and insulating ceramic capacitors along with the fact that the former has much larger capacitance than the latter in the same geometrical size. The boundary layer which is formed in semiconducting capacitors of this example has obviously a rectifying property but that of insulating ceramic bodies has no such property. This is still another essential difference between these two types of capacitors. The above descriptions show the various excellent properties in practical applications of oxide compositions falling within the area A–B–C–D–E–F–G in FIG. 1, which compositions do not include the Mn and oxygen component. The ceramic components of this invention are therefore limited to compositions falling within said area.

Table 1 gives the oxide composition, capacitance and tan $\delta$ of the ceramic bodies prepared from various compositions within and outside the limited area. The preparing processes and conditions of measurements are the same as in the Example I. Samples 1, 3, 4 and 7 are examples falling within the area describing the present invention and the other examples are those falling outside of the said area. Mn ions expressed in mol percent in respect to the Ba(Ti, Zr)$O_3$, were added to the compositions in the proportion of 1 mol percent.

TABLE 1

| Number of specimen | $BaTiO_3$ (mol percent) | $BaZrO_3$ (mol percent) | $Bi_2O_3$ (mol percent) | $TiO_2$ (mol percent) | Mn ion (mol percent) | Capacitance (f./cm.²) | Tan δ (percent) | Insulating resistance (m./cm.²) |
|---|---|---|---|---|---|---|---|---|
| 1 | 90.35 | 5.77 | 0.97 | 2.91 | 1.0 | 0.127 | 7.6 | 38 |
| 2 | 88.58 | 5.65 | 2.89 | 2.89 | 1.0 | 0.032 | 2.3 | 600 |
| 3 | 88.58 | 5.65 | 1.92 | 3.85 | 1.0 | 0.184 | 5.4 | 280 |
| 4 | 86.02 | 5.49 | 2.83 | 5.66 | 1.0 | 0.188 | 5.5 | 70 |
| 5 | 78.96 | 5.04 | 5.33 | 10.67 | 1.0 | 0.002 | 9.4 | 750 |
| 6 | 75.2 | 4.8 | 4.0 | 16.0 | 1.0 | 0.086 | 47 | 35 |
| 7 | 69.84 | 9.52 | 0.8 | 19.84 | 1.0 | 0.180 | 7.7 | 48 |
| 8 | 64.48 | 4.12 | 2.0 | 29.4 | 1.0 | 0.152 | 23 | 100 |
| 9 | 43.82 | 5.98 | 0.4 | 49.8 | 1.0 | 0.091 | 9.1 | 0.27 |

In every example, a large capacitance and suitable of tan $\delta$ and insulating resistance for practical applications are obtained. In other words, ceramics having excellent properties in this regard are attained.

The defects of ceramic bodies of compositions outside the region described in FIG. 1 of this invention will be described. At first, in the case where the $Bi_2O_3$ content is higher than that described by the line B–C in FIG. 1, the sintering temperature rises so remarkably with the increase of the amount of excess $Bi_2O_3$ that dense ceramic bodies cannot be obtained with ease unless a binder is employed. An investigation by use of the X-ray powder diffraction method has revealed that ceramic bodies obtained when the $Bi_2O_3$ content is much in excess of that contemplated herein, contain free $Bi_2O_3$ in addition to the solid solution of barium titanate. Besides this defect, the ceramic bodies with such an excess $Bi_2O_3$ have a tendency to break during the treatment to make them semiconducting, and therefore it is difficult to retain their shape during said treatment. Particularly, ceramic bodies of compositions in which the $Bi_2O_3$ is in excess and remains in an independent phase, break off so easily that it is impossible to make them semiconductive in a sufficient manner. This breaking off phenomenon has a tendency to decrease by increasing the amount of substitution of $BaZrO_3$ for the $BaTiO_3$ component.

In the case of the specimen 2 of Table 1, which retains the shape without breaking off, the capacitance is quite low. Thus, this specimen loses one of the essential features of semiconducting ceramic capacitors and is not fitted for practical applications. Increasing the amount of the manganese ion additive also promotes this tendency. It has been discovered that this decrease of capacitance is caused by the fact that the reoxidation during the process of plating electrodes progresses too rapidly in this composition range. The similar tendency of the capacitors to break off during the semiconductorizing treatment is also seen in the composition region, where $Bi_2O_3$ content is much in excess of the line C–D, as described above, about the region where the $Bi_2O_3$ is higher than that defined by the line B–C in FIG. 1. In some cases, the shape of the ceramic bodies is retained, but even at that time, the capacitance of the ceramic bodies becomes quite low, owing to strong reoxidation, which makes them unfit for practical applications. Specimen 5 in Table 1 is such an example. In the compositions about the point D, where the $Bi_2O_3$ is in excess, the free $Bi_2O_3$ disappears and another compound which is probably $Ba_2Bi_4Ti_5O_{18}$ or a partly substituted compound of $Ba_2Bi_4Ti_5O_{18}$ has been recognized besides the Ba(Ti,Zr)$O_3$ solid solution.

The specimen 6 in the Table 1 is an example of the ceramic composition in the region where the Ba(Ti, Zr)$O_3$ content is lower than on the line D–E. Such compositions are unfit for practical applications because of a strong increase in the tan $\delta$ value and because of a tendency of the capacitance to increase. This region is characterized by the existence of the other compound mentioned above about that point D in FIG. 1. The coexistence of this compound is accompanied by a sharp increase in tan $\delta$, as illustrated by the specimen 8 in the Table 1, which is located in the composition region where the $Bi_2O_3$ content is in excess of the amounts described on the line E–F of FIG. 1. The above-mentioned tendency was slightly promoted by increasing the amount of the substituted $BaZrO_3$ compound. As for the region where the $Bi_2O_3$ content is lower than on the line E–F, an examination by the X-ray powder diffraction method has revealed the existence of a solid solution of $Ba(Ti, Zr)O_3$ and, in addition, small amounts of some compound other than the compounds mentioned above. However, the existence of $Ba_2Bi_4Ti_5O_{18}$ has not been found in this region, and the ceramic bodies of compositions in this region possess excellent properties, as illustrated in Example III.

The properties of the semiconducting capacitors of this invention cannot be influenced by the existence of other compounds in small amounts, as in conventional capacitors. This is one of the features of the semiconducting ceramic capacitors of the present invention from the viewpoint of practical applications. However, in the region 1, where the $Ba(Ti, Zr)O_3$ content is lower than on the line F–G in FIG. 1, the amount of the other coesting compounds becomes so large that the value of insulating resistance decreases remarkably, as shown in the case of specimen 9 in Table 1, which makes the ceramic bodies of this composition region unfit for practical applications. For the reasons given above, it is obvious that the oxide compositions of the present invention, that is, falling within the region defined by A–B–C–D–E–F–G in FIG. 1, have excellent capacitance characteristics, tan $\delta$ and insulating resistance. Further, it has been discovered that these excellent properties are not lost when a part of the composition in this region is replaced by a small amount of calcium titanate, magnesium titanate, or other double oxides of the $ABO_3$ type.

Figure 4:
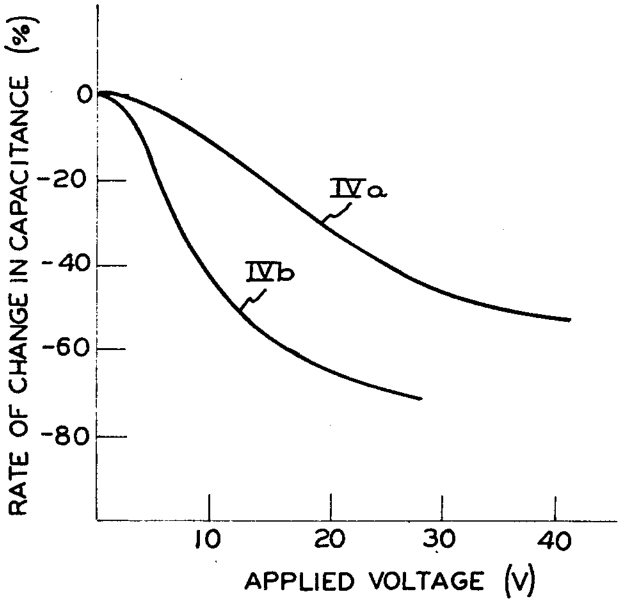
FIG. 4 graphically shows the relationship between the applied voltage and the capacitance change.
Figure 5:
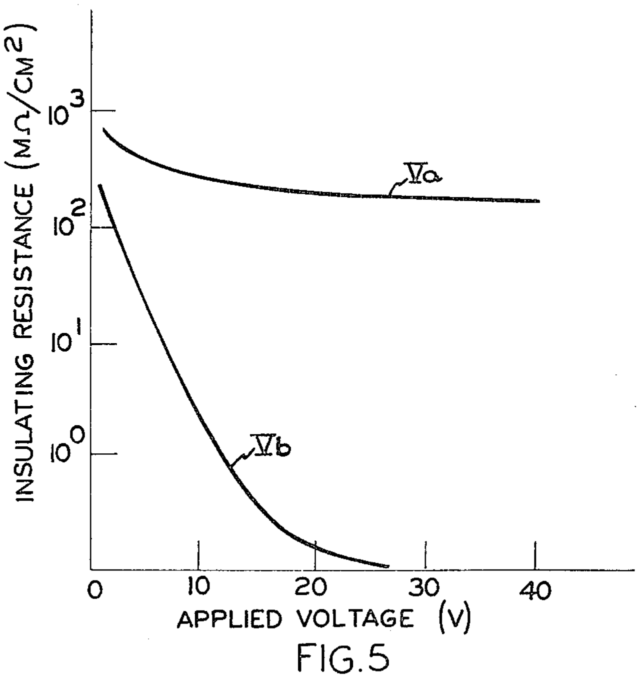
FIG. 5 depicts the relationship between the applied voltage and the insulation resistance.

The effect of adding Mn ions to compositions falling within the region defining the present invention will now be described. FIG. 4 graphically illustrates the variation of the capacitance of semiconducting ceramic capacitors in which the D.C. voltage is applied, measured by percentage based on the value of the unloaded capacitance. Curve IV*a* shows the value about the oxide composition illustrated by specimen 3 of Table 1 as a typical example, and curve IV*b* shows the value about the one which has the same composition as specimen 3 but in which Mn ions are added thereto for comparison purposes. The method of preparation of the specimens and conditions of measurement are the same as in Example I. FIG. 5 specifically shows the relationship between the variation of the insulation resistance and the applied D.C. voltage and curves V*a* and B*v* correspond with specimen 3 and specimen 3 with Mn ions added thereto, respectively. As clearly seen in these figures, the addition of the Mn ions makes for a much improved variation of capacitance and also brings a remarkable improvement in the insulation resistance of semiconducting capacitors.

Figure 6:
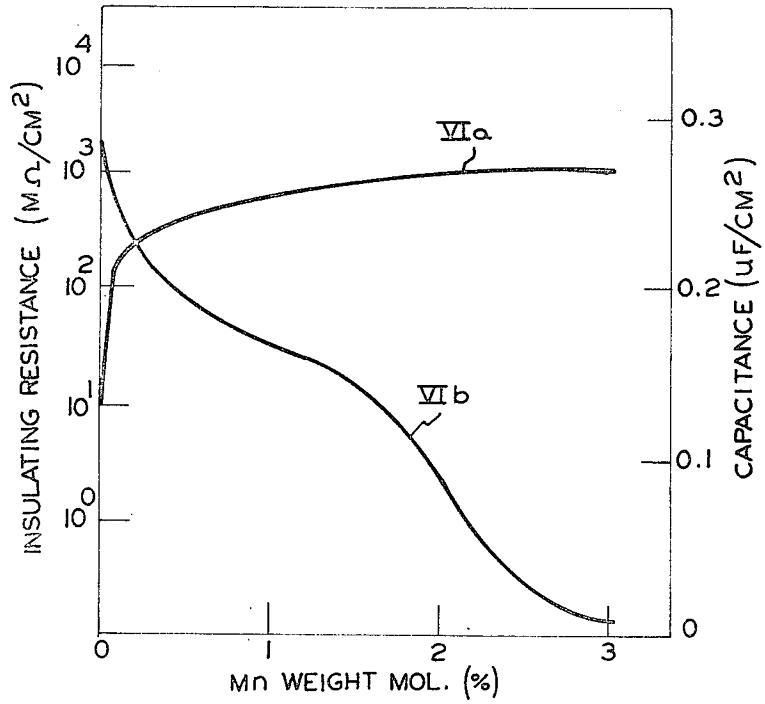
FIG. 6 shows the dependence of the insulation resistance and the capacitance of said capacitors on the amount of added Mn ions.

FIG. 6 shows the relationship between the insulation resistance and the amount of added Mn ions for semiconducting capacitors prepared by the same means and from the same composition as in Example I. The vertical axis on the left side gives the value of the insulation resistance and the one on the right gives the value of the capacitance. The curves VI*a* and VI*b* show the insulation resistance and the capacitance, respectively. As seen from this figure, the addition of Mn ions, even in a small amount, brings a rapid increase in the insulation resistance. It is thought that this increase is caused by the lowering of the conduction electron density in the barrier layer owing to the valency composition effect of Mn ions in the barrier. In the case where the amount of added Mn ions is less than 0.01 mol percent, the insulation resistance falls below 10 $M\Omega/cm.^2$ and the improvement of the insulation resistance by Mn ion added is ineffective and, at the same time, variation of capacitance versus applied voltage increases. On the other hand, when the amount of the added Mn ions exceed 2 mol percent, the capacitance becomes quite small, although the insulation resistance is high. Thus, the possibility of attaining a large capacitance with a small size capacitor, which is a feature of the semiconducting capacitors herein, is lost at that time.

The effect of the addition of Mn ions described above is similar at any part of the mentioned composition region A–B–C–D–E–F–G. So the amount of Mn ions to be added is limited within the region from 0.01 to 2 mol percent.

As understood from the detailed description given above, the ceramic capacitors prepared according to the present invention are superior to the prior art capacitors in several respects. That is, the presently disclosed capacitors have quite a larger capacitance and the temperature dependence of capacitance can be arbitrarily controlled, which features are not exhibited by prior art capacitors. Also, the capacitors of the present invention exhibit small variation in their capacitance and have a high insulation resistance versus applied voltage, which enables them to be used in a wider range of appreciation to circuits operated at high working voltages, which is a highly important feature in practical uses. In fact, said capacitors may be manufactured effectively, especially in the construction of electronic circuits in which they are employed, since lead wires can be directly soldered on electrodes owing to the peculiar chemical properties of ceramic bodies. For this same reason, said capacitors have large advantages over prior art capacitors when utilized as chip capacitors in miniaturized electronic circuits.

It must be emphasized that the amount of $BaZrO_3$ used to replace the $BaTiO_3$ in the barium titanozirconate solid solutions of the present invention may be as high as 50 mol percent and preferably less than 25 mol percent based on the amount of the $BaTiO_3$ component.

What is claimed is:

1. A ceramic semiconducting composition prepared by first sintering at a temperature of about 1250° C. in an oxidizing atmosphere, a composition consisting essentially of barium titanozirconate solid solutions represented by the formula $Ba(Ti, Zr)O_3$ with $Bi_2O_3$ and $TiO_2$ added therto, which composition falls within the polygonal area described by the line A–B–C–D–E–F–G– in FIG. 1, further adding Mn ions thereto within the range of 0.01 to 2 mol percent, and then firing the composition at a temperature of about 1000° C. in a hydrogen atmosphere followed by further firing the composition at a temperature of about 800° C. in an oxidizing atmosphere.

2. A method of producing semiconducting ceramic bodies which comprises:

(1) mixing a solid solution of $Ba(Ti, Zr)O_3$ obtained by mixing together $BaTiO_3$ and $BaZrO_3$ wth $TiO_2$ and $Bi_2O_3$ so as to fall within the polygonal area described by the line A–B–C–D–E–F–G in FIG. 1, and further adding Mn ions in amounts of 0.01 to 2 mol percent thereto, (2) pressing the compositions into desired shape, (3) sintering the thus-obtained shaped bodies at a temperature of about 1250° C. in an oxidizing atmosphere for about 2 hours, (4) firing the composition at a temperature of about 1000° C. in a hydrogen atmosphere for about 2 hours, and (5) further firing the composition at a temperature of about 800° C. in an oxidizing atmosphere.

3. A method of producing a semiconducting ceramic body as in claim 2 wherein the following raw material mixture is used:

| | Mol percent |
|---|---|
| $BaTiO_3$ | 90.35 |
| $BaZrO_3$ | 5.77 |
| $Bi_2O_3$ | 0.97 |
| $TiO_2$ | 2.91 |
| Mn | 1.00 |

4. A method of producing a semiconducting ceramic body as in claim 2 wherein the following raw material mixture is used:

| | Mol percent |
|---|---|
| $BaTiO_3$ | 88.58 |
| $BaZrO_3$ | 5.65 |
| $Bi_2O_3$ | 1.92 |
| $TiO_2$ | 3.85 |
| Mn | 1.00 |

5. A method of producing a semiconducting ceramic body as in claim 2 wherein the following raw material mixture is used:

| | Mol percent |
|---|---|
| $BaTiO_3$ | 86.02 |
| $BaZrO_3$ | 5.49 |
| $Bi_2O_3$ | 2.83 |
| $TiO_2$ | 5.66 |
| Mn | 1.00 |

6. A method of producing a semiconducting ceramic body as in claim 2 wherein the following raw material mixture is used:

| | Mol percent |
|---|---|
| $BaTiO_3$ | 69.84 |
| $BaZrO_3$ | 9.52 |
| $Bi_2O_3$ | 0.80 |
| $TiO_2$ | 19.84 |
| Mn | 1.00 |

References Cited

UNITED STATES PATENTS

| | | | |
|---|---|---|---|
| 3,464,924 | 9/1969 | Banno et al. | 106—39 R |
| 2,934,442 | 4/1960 | Herbert | 106—39 R |
| 3,103,440 | 9/1963 | Cline et al. | 106—39 R |
| 3,472,776 | 10/1969 | Derbyshire | 106—39 R |
| 2,402,516 | 6/1946 | Wainer | 106—46 |

TOBIAS E. LEVOW, Primary Examiner

W. R. SATTERFIELD, Assistant Examiner

U.S. Cl. X.R.

106—39 R; 252—63.5; 264—61